United States Patent
Kaibara (10) Patent No.: US 10,630,916 B2
(45) Date of Patent: Apr. 21, 2020

(54) ELECTRONIC DEVICE, METHOD OF CONTROLLING SAME, AND IMAGE SENSOR

(71) Applicant: CANON KABUSHIKI KAISHA, Tokyo (JP)

(72) Inventor: Hiroshi Kaibara, Hino (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/205,563

(22) Filed: Nov. 30, 2018

(65) Prior Publication Data

US 2019/0174080 A1 Jun. 6, 2019

(30) Foreign Application Priority Data

Dec. 6, 2017 (JP) .................. 2017-234300

(51) Int. Cl.
| | |
|---|---|
| H04N 5/353 | (2011.01) |
| H04N 5/378 | (2011.01) |
| H04N 5/357 | (2011.01) |
| H04N 5/369 | (2011.01) |
| H04N 5/341 | (2011.01) |
| H04N 5/374 | (2011.01) |
| H04N 5/343 | (2011.01) |

(52) U.S. Cl.
CPC .......... H04N 5/353 (2013.01); H04N 5/341 (2013.01); H04N 5/343 (2013.01); H04N 5/357 (2013.01); H04N 5/374 (2013.01); H04N 5/378 (2013.01); H04N 5/379 (2018.08)

(58) Field of Classification Search
CPC .... H04N 5/2256; H04N 5/235; H04N 5/2353; H04N 5/2354; H04N 5/353; H04N 5/3532
See application file for complete search history.

(56) References Cited

U.S. PATENT DOCUMENTS

| | | | |
|---|---|---|---|
| 2014/0184866 A1* | 7/2014 | Ogushi | H04N 5/23212 348/308 |
| 2017/0006207 A1* | 1/2017 | Shen | H04N 5/2353 |
| 2017/0332013 A1* | 11/2017 | Kageyama | H04N 5/23229 |
| 2017/0332027 A1* | 11/2017 | Furumochi | H04N 5/23235 |

FOREIGN PATENT DOCUMENTS

JP 2017-169027 A 9/2017

* cited by examiner

*Primary Examiner* — Paul M Berardesca (74) *Attorney, Agent, or Firm* — Cowan, Liebowitz & Latman, P.C.

(57) ABSTRACT

An image sensor capable of switching between a first path configured to output an image signal read from a plurality of pixels to an external after storing the image signal in a memory, and a second path configured to output the image signal to the external without storing the image signal in the memory is configured. In a case of shooting using a supplemental light source, the image sensor is controlled so as to use the first path and to have a speed for reading the image signal from the plurality of pixels be faster than a speed for outputting the image signal from the memory to the external.

9 Claims, 7 Drawing Sheets

ELECTRONIC DEVICE, METHOD OF CONTROLLING SAME, AND IMAGE SENSOR

BACKGROUND OF THE INVENTION

Field of the Invention

The present invention relates to an electronic device, a method of controlling the same, and an image sensor.

Description of the Related Art

An image sensor that is for converting an optical image to a group of electrical signals and in which a plurality of photoelectric conversion elements are arranged is widely used in an image capture apparatus such as a digital camera. Conventionally CCD image sensors were mainstream, but in recent years CMOS image sensors have become mainstream.

Because a CMOS image sensor is normally driven for each pixel line, charge accumulation periods differs between differing pixel lines out of pixel lines that configure an image for one screen. Accordingly, in a case of performing shooting that uses auxiliary light with a short irradiation time as with a flash light in a shooting mode that does not use a mechanical shutter, there are cases where there are pixel lines for which an auxiliary light irradiation period is outside of the charge accumulation period (a flash-band phenomenon). The flash-band phenomenon is more likely to occur for faster shutter speeds (shorter charge accumulation periods). Japanese Patent Laid-Open No. 2017-169027 recites a technique for detecting and correcting for the occurrence of flash-band due to a supplemental light source attached to another camera emitting light at a timing that is not intended by a photographer.

It is possible to suppress occurrence of the flash-band phenomenon if a shift of the charge accumulation period for each pixel line is reduced. Here, the shift of the charge accumulation period for each pixel line can be reduced by making the speed for reading out an image signal faster for each pixel line. However, the readout speed is limited by a data transfer circuit and a processing speed of a signal processing circuit that processes read-out image data. When the processing speed of a signal processing circuit or a transfer circuit is increased in order to increase the readout speed, for example the scale, power consumption, and heat of the circuit increases. This is not desirable because it leads to an increase in size of the apparatus or a rise in cost.

The present invention is made in consideration of such problems of the conventional techniques, and provides an electronic device capable of effectively suppressing the occurrence of the flash-band phenomenon due to a supplemental light source that emits light in conjunction with an image capturing operation, a method of controlling the same, and an image sensor.

SUMMARY OF THE INVENTION

According to an aspect of the present invention, there is provided an electronic device comprising: an image sensor having a plurality of pixels and capable of switching between a first path in which an image signal read from the plurality of pixels is stored in a memory and then outputted from the memory to an external, and a second path in which the image signal read from the plurality of pixels is output to the external without being stored in the memory; a processor that executes a program stored in a memory and functions as: a control unit configured to, in a case of performing shooting that uses a supplemental light source, control the image sensor so as to use the first path and to make a speed at which the image signal is read from the plurality of pixels faster than a speed at which the image signal is outputted from the memory to the external.

According to an aspect of the present invention, there is provided an image sensor comprising: a plurality of pixels; and switching circuitry that switches between a path in which an image signal read from the plurality of pixels is stored in a memory and then outputted from the memory to an external, and a path in which the image signal read from the plurality of pixels is output to the external without being stored in the memory.

According to another aspect of the present invention, there is provided a method of controlling an electronic device having an image sensor having a plurality of pixels and capable of switching between a first path in which an image signal read from the plurality of pixels is stored in a memory and then outputted from the memory to an external, and a second path in which the image signal read from the plurality of pixels is output to the external without being stored in the memory, the method comprising: in a case of performing shooting that uses a supplemental light source, controlling the image sensor so as to use the first path and to make a speed at which the image signal is read from the plurality of pixels faster than a speed at which the image signal is outputted from the memory to the external.

According to a further aspect of the present invention, there is provided a non-transitory computer-readable medium storing a program for a computer included in an electronic device, wherein the electronic device comprises an image sensor having a plurality of pixels and capable of switching between a first path in which an image signal read from the plurality of pixels is stored in a memory and then outputted from the memory to an external, and a second path in which the image signal read from the plurality of pixels is output to the external without being stored in the memory, and wherein the program, when executed by the computer, causes the computer to function as a control unit configured to, in a case of performing shooting that uses a supplemental light source, control the image sensor so as to use the first path and to make a speed at which the image signal is read from the plurality of pixels faster than a speed at which the image signal is outputted from the memory to the external.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. In the embodiments below, description is given below regarding a digital camera as an example of an electronic device that can adopt an image sensor according to the present invention. However, the present invention can be applied to any electronic device that uses a solid-state image sensor. Such an electronic device includes a digital camera, a personal computer, a tablet computer, a mobile telephone, a smart phone, a PDA, a game device, a drive recorder, a robot, or the like, but is not limited to these. In addition, the present invention is not limited to the embodiments described below, and various modifications or changes are possible within the scope recited in the claims.

First Embodiment

Figure 1:
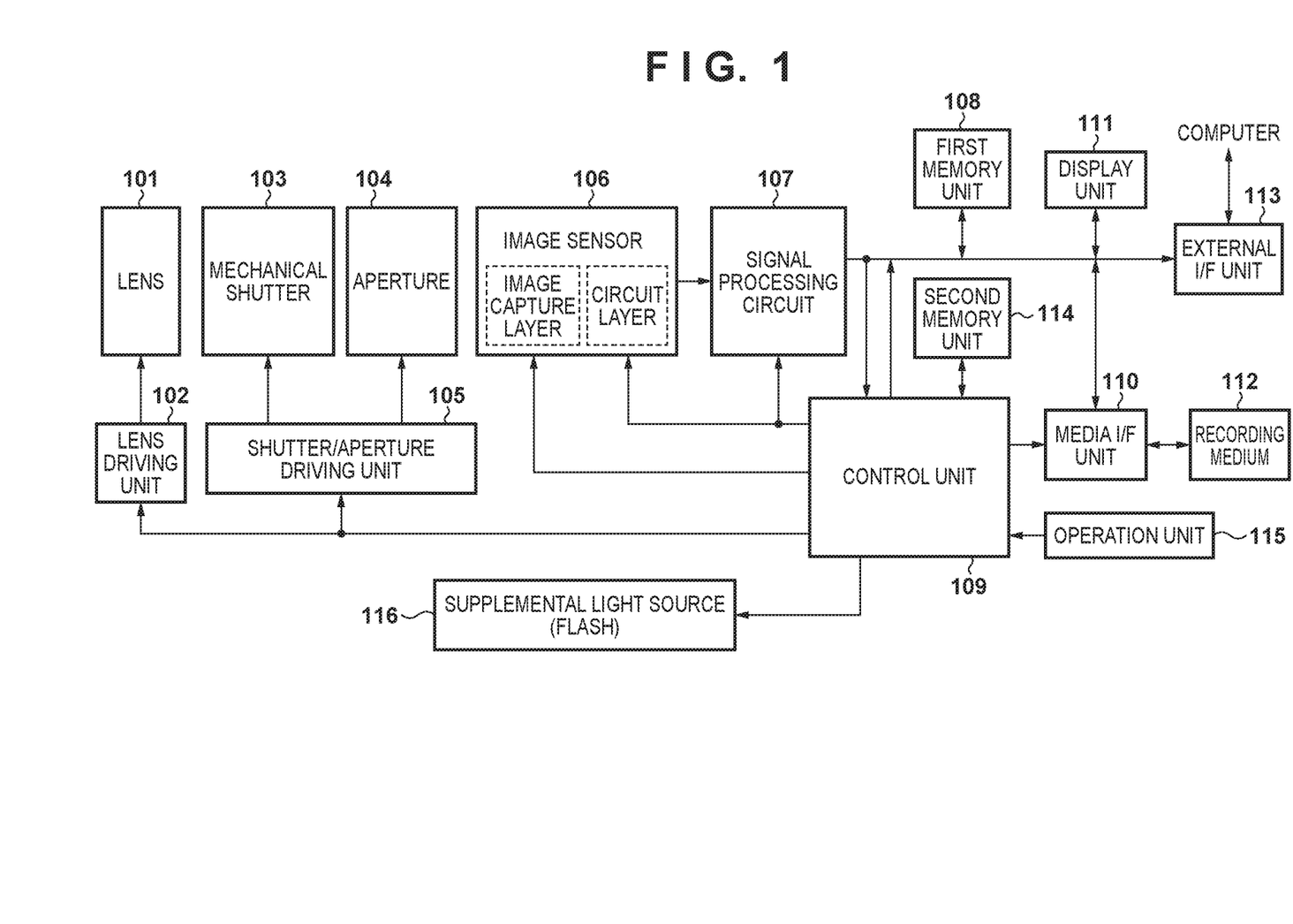
FIG. 1 is a view that illustrates an example of a configuration of a digital camera according to an embodiment of the present invention.

FIG. 1 is a block diagram that illustrates an example of a functional configuration of a digital camera as an example of an electronic device that can adopt an image sensor according to an embodiment of the present invention.

A light beam incident from a lens unit 101 is adjusted to an appropriate amount of light by an aperture 104, and forms a subject image on an image capture surface of an image sensor 106. The subject image formed on the image capture surface is converted to electrical signals by photoelectric conversion elements that the image sensor 106 has. After gain adjustments, A/D conversions, or the like are performed on the electrical signals, they are sent to a signal processing circuit 107 as R (red), Gr (green), Gb (green), and B (blue) digital image signals in accordance with the color of color filters provided on pixels. The signal processing circuit 107 performs, with respect to the received digital image signals, various image processing such as low-pass filter processing for reducing noise, a shading process, and a WB process, and also performs various correction processing, data compression processing, or the like.

For the lens unit 101, an angle of view, a focus, or the like are adjusted by a zoom lens or a focus lens being driven by a lens driving unit 102. A mechanical shutter 103 and the aperture 104 are driven by a shutter/aperture driving unit 105. A control unit 109 has, for example, one or more programmable processors (MPUs), a nonvolatile memory (a ROM) for storing a program, setting values, or the like, and a memory (a RAM) used for an MPU to execute a program. The control unit 109 realizes functions of the digital camera by the MPU executing the program to control each unit of the digital camera.

A first memory unit 108 is a memory for temporarily storing image data, and is an external memory of the image sensor 106. A media interface (I/F) unit 110 reads and writes data from and to a recording medium 112 which is a memory card, for example. A display unit 111 is used for display of the live-view image, a shot image, a GUI, various information of the digital camera, and the like. An external I/F unit 113 is a communication interface for an external device (a computer or the like). A second memory unit 114 is used for the control unit 109 to store a processing result or the like. An operation unit 115 is an input device such as a switch, button, or key, and is used by a user to input an instruction to the digital camera. Upon detecting an operation of the operation unit 115, the control unit 109 executes an operation in accordance with the detected operation.

A supplemental light source 116 is a flash for example, and it emits light for a short time during a charge accumulation period under control by the control unit 109. The control unit 109 can decide whether to emit light by the supplemental light source 116 and an amount of light to emit in accordance with a result of an AE process, a user setting, or the like. Note that the supplemental light source 116 may be an integrated type and may be an external type. In addition, it may be configured to emit light in conjunction with (in synchronization with) an image capturing operation by an electronic device without being directly attached to a camera, and furthermore a plurality of the supplemental light source 116 may be connected.

Figure 2:
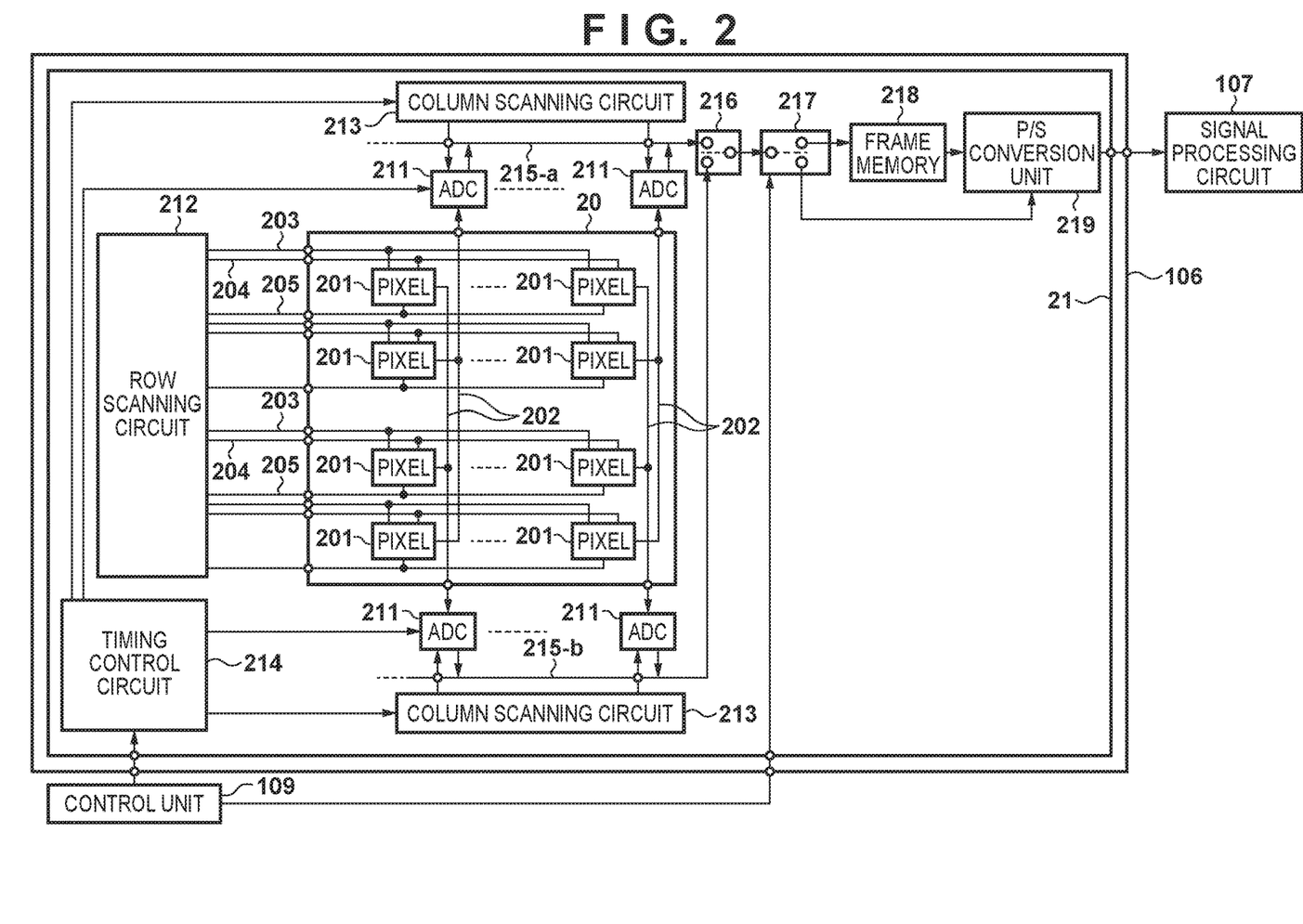
FIG. 2 is a view that illustrates a structural example of an image sensor according to an embodiment of the present invention.

FIG. 2 is a block diagram that illustrates an example of a configuration of the image sensor 106.

The image sensor 106 has a first semiconductor chip 20 (an image capture layer) as a first integrated circuit and a second semiconductor chip 21 (a circuit layer) as a second integrated circuit, and has a structure in which the first semiconductor chip 20 is stacked on the second semiconductor chip 21. The first semiconductor chip 20 has a plurality of pixels 201 arranged in a matrix pattern, and is disposed so that light is incident on the pixels 201 (in other words, the first semiconductor chip 20 has an image capture surface).

The pixels 201 are connected to transfer signal lines 203, reset signal lines 204, and row selection signal lines 205 in a horizontal direction (a row direction), and are connected to vertical output lines 202 in a vertical direction (a column direction). Note that a connection destination differs for each vertical output line 202 in units of readout rows.

The second semiconductor chip 21 has pixel driving circuits such as a column ADC block 211, a row scanning circuit 212, a column scanning circuit 213, and a timing control circuit 214. The second semiconductor chip further has a first switch 216, a second switch 217, a frame memory 218, and a P/S conversion unit 219. The column ADC block 211 performs an A/D conversion on an image signal read out from the pixels 201, and outputs a result as image data.

By forming the pixels 201 on the first semiconductor chip 20 and integrating peripheral circuits in the second semiconductor chip 21, it is possible to have different manufacturing processes for an image capture layer and a circuit layer of the image sensor 106. Accordingly, for example, by manufacturing the circuit layer by more elaborate process rules that for the image capture layer, it is possible to achieve higher speed, miniaturization, and an increase in the sophistication of functions (for example, an increase in capacity of the frame memory 218) due to a density increase and thinned wiring. Note that a peripheral circuit may be a pixel driving circuit, a readout circuit, an internal memory circuit, a computation circuit, an AD converter, an S/P conversion circuit, or the like, but there is no limitation to these.

The first switch 216 is a switch for sequentially and selectively outputting, to the second switch 217, image data outputted from a horizontal signal line 215-a and a horizontal signal line 215-b for each channel Operation of the first switch 216 is controlled by the timing control circuit 214 or the control unit 109.

The frame memory 218 temporarily stores image data obtained by shooting. In a case of temporarily storing, in the frame memory 218, image data read through the column ADC block 211 from the pixels 201, a readout speed is not restricted by a transfer circuit or a processing capacity of the signal processing circuit 107. Accordingly, it is possible to read out image data at a speed in excess of an upper limit of a readout speed that is decided in accordance with the processing capacity of the signal processing circuit or the transfer circuit, and it is possible to shorten a read time for the image data. As a result, it is possible to suppress occurrence of the flash-band phenomenon if a shift of the accumulation period for each pixel line is reduced. Note that, in a case of using the frame memory 218, image data is supplied from the frame memory 218 to the signal processing circuit 107 at a speed in accordance with the processing capacity of the signal processing circuit 107 or the transfer circuit as usual.

The second switch 217 switches an output destination of image data supplied from the first switch 216 to one of the frame memory 218 or the P/S conversion unit 219, in accordance with control by the control unit 109. The second switch 217 switches whether to directly supply image data to the P/S conversion unit 219 without temporarily storing it in the frame memory 218, or supply image data to the P/S conversion unit 219 after temporarily storing it in the frame memory 218. In other words, the second switch 217 switches between a first path for outputting image data externally without temporarily storing it in the frame memory 218, and a second path for outputting image data externally after temporarily storing it in the frame memory 218. In this way, the image sensor 106 is configured to be able to switch between a first path and a second path for outputting an image signal that is read out.

As described later, in the present embodiment, the control unit 109 decides whether to temporarily store image data in the frame memory 218 in accordance with the type of a shutter used in shooting, whether to use the supplemental light source 116, a shutter speed, or the like. The control unit 109 controls an output destination of the second switch 217 in accordance with the decision. Note that the first and second switches 216 and 217 are illustrated as mechanical switches for convenience in FIG. 2, but in reality they can be configured from switches that do not have mechanically movable parts and are configured from logic circuits or the like.

In addition, operation of the image sensor 106 is controlled by the control unit 109 through the timing control circuit 214. For example, a change of a data rate for a series of processing for reading out an image signal, performing an A/D conversion, and storing image data in the frame memory 218 can be realized by the control unit 109 changing operation of the timing control circuit 214. In a case of temporarily storing image data in the frame memory 218, the control unit 109 in the present embodiment controls the timing control circuit 214 so as to execute the readout of an image signal and processing up until temporary storage to the frame memory 218 faster than in a case of not performing temporary storage of image data.

The P/S conversion unit 219 converts image data to serial data and then outputs the serial data to the signal processing circuit 107.

Figure 3A:
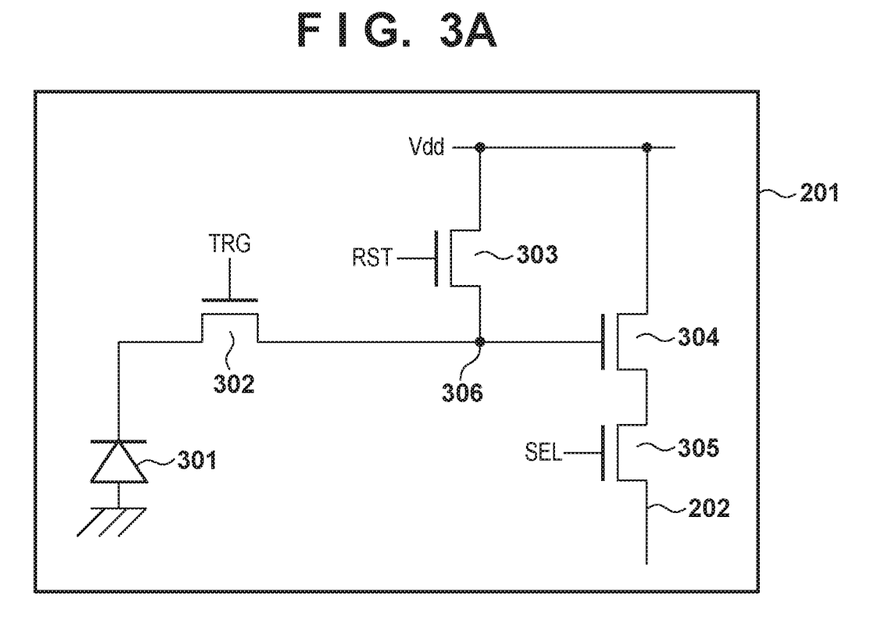
FIG. 3A through FIG. 3B are views that illustrate examples of configurations of a pixel and a column ADC block according to the embodiment of the present invention.
Figure 3B:
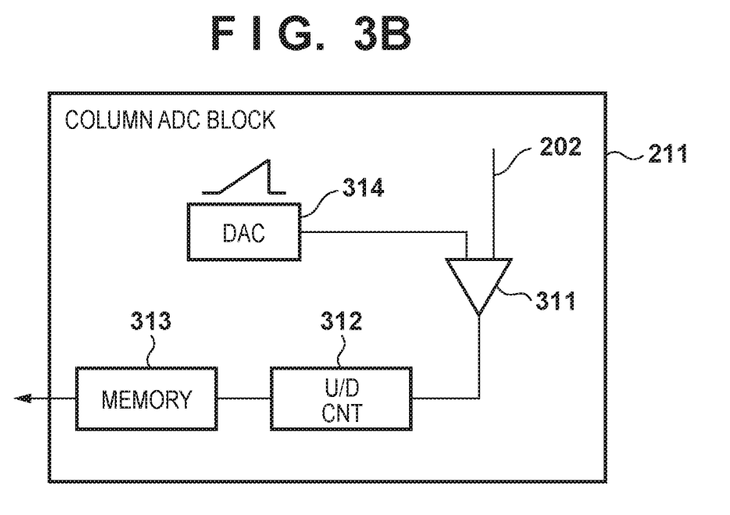

FIG. 3A is a circuit diagram that illustrates an example of a configuration of a pixel 201 of the image sensor 106, and FIG. 3B is a view that illustrates an example of a functional configuration of the column ADC block 211. Note that illustration is given for an example where the pixel 201 is configured by using n-channel MOS transistors.

In the pixel 201, a photodiode (PD) 301 is a photoelectric conversion element, and it generates a charge (electrons) in accordance with an amount of light received. A cathode of the PD 301 is connected to the gate of an amplification transistor 304, via a transfer transistor 302. A node connected to the gate of the amplification transistor 304 configures a floating diffusion (FD) portion 306 for converting charge to a voltage.

The transfer transistor 302 is connected between the cathode of the PD 301 and the FD portion 306, turns on by a transfer pulse φRST being provided to the gate via a transfer signal line 203, and transfers a signal charge generated by the PD 301 to the FD portion 306.

For a reset transistor 303, its drain is connected to a pixel power supply Vdd and its source is connected to the FD portion 306, and it turns on by the reset pulse φRST being provided to its gate via a reset signal line 204. By the reset transistor 303 turning on before transfer of a signal charge from the PD 301 to the FD portion 306, the FD portion 306 is reset by the power supply potential Vdd.

For the amplification transistor 304, its gate is connected to the FD portion 306 and its drain is connected to the pixel power supply Vdd, and it outputs, as a reset level, the potential of the FD portion 306 after the FD portion 306 is reset by the reset transistor 303. In addition, the amplification transistor 304 outputs, as a signal level, the potential of the FD portion 306 after the signal charge is transferred by the transfer transistor 302.

For a selection transistor 305, for example its drain is connected to the source of the amplification transistor 304 and its source is connected to a vertical output line 202, and it turns on by a selection pulse φSEL being provided to its gate via the row selection signal lines 205. When the selection transistor 305 turns on, the signal (signal level) outputted by the amplification transistor 304 is relayed to the vertical output line 202.

The selection transistor 305 may be connected between the pixel power supply Vdd and the drain of the amplification transistor 304. In addition, the configuration illustrated in FIG. 3A is an example, and another configuration may be taken, such as a configuration in which the amplification transistor 304 and the selection transistor 305 are served by one transistor, for example.

A signal outputted via a vertical output line 202 from a selected pixel 201 is transferred to the column ADC block 211. The column ADC block 211 has a comparator 311, an up/down counter 312, a memory 313, and a D/A converter (DAC) 314.

For the comparator 311, one of a pair of input terminals is connected to the vertical output lines 202, and the other is connected to an output of the DAC 314. The DAC 314 outputs a ramp signal whose level linearly increases or decreases based on a reference signal inputted from the timing control circuit 214. The comparator 311 compares the level of the ramp signal inputted from the DAC 314, and the level of the image signal inputted from the vertical output lines 202. Note that the timing control circuit 214 outputs a reference signal to the DAC 314 in accordance with control by the control unit 109.

If the level of the image signal is less than the level of the ramp signal, the comparator 311 outputs a high-level signal, and if the level of the image signal is higher than the level of the ramp signal, the comparator 311 outputs a low-level signal, for example.

The up/down counter 312 is connected to the comparator 311, and counts the length of a period from when comparison starts until output of the comparator 311 changes, and outputs the count value (a digital value) to the memory 313. The count value outputted to the memory 313 is a digital value that corresponds to the image signal inputted from the vertical output lines 202.

Subsequently, the image signal (a digital value) stored in the memory 313 is transferred to the frame memory 218 via the first switch 216, and through the horizontal signal line 215-*a* or the horizontal signal line 215-*b* in synchronization with a signal from the column scanning circuit 213.

Figure 4A:
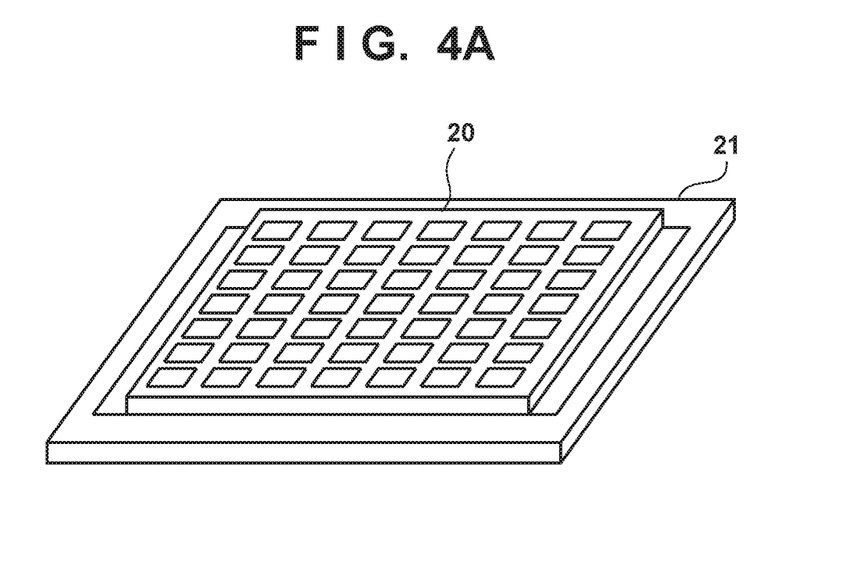
FIG. 4A through FIG. 4B are an external perspective view and a vertical cross-sectional view an image sensor according to the embodiment of the present invention.
Figure 4B:
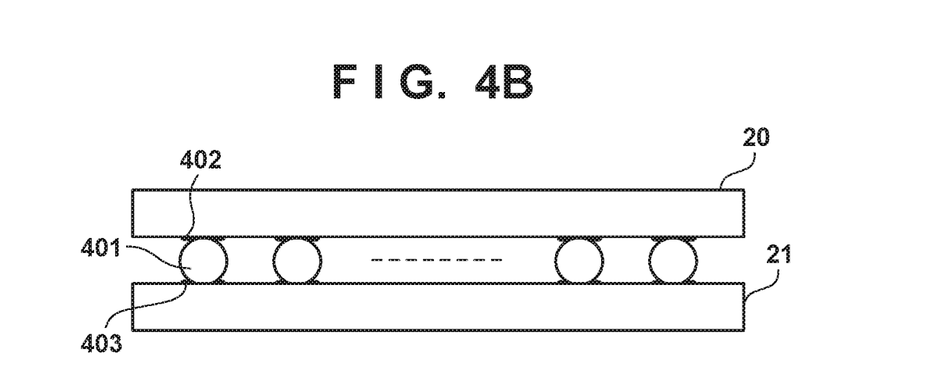

FIG. 4A is a perspective view that schematically illustrates an outer appearance of the image sensor 106, and FIG. 4B illustrates a cross-sectional view of the image sensor 106.

The first semiconductor chip (an image capture layer) and the second semiconductor chip (a circuit layer) that configure the image sensor 106 are integrated by micro bumps 401 that electrically and mechanically connect respective micro pads 402 and 403.

Figure 5:
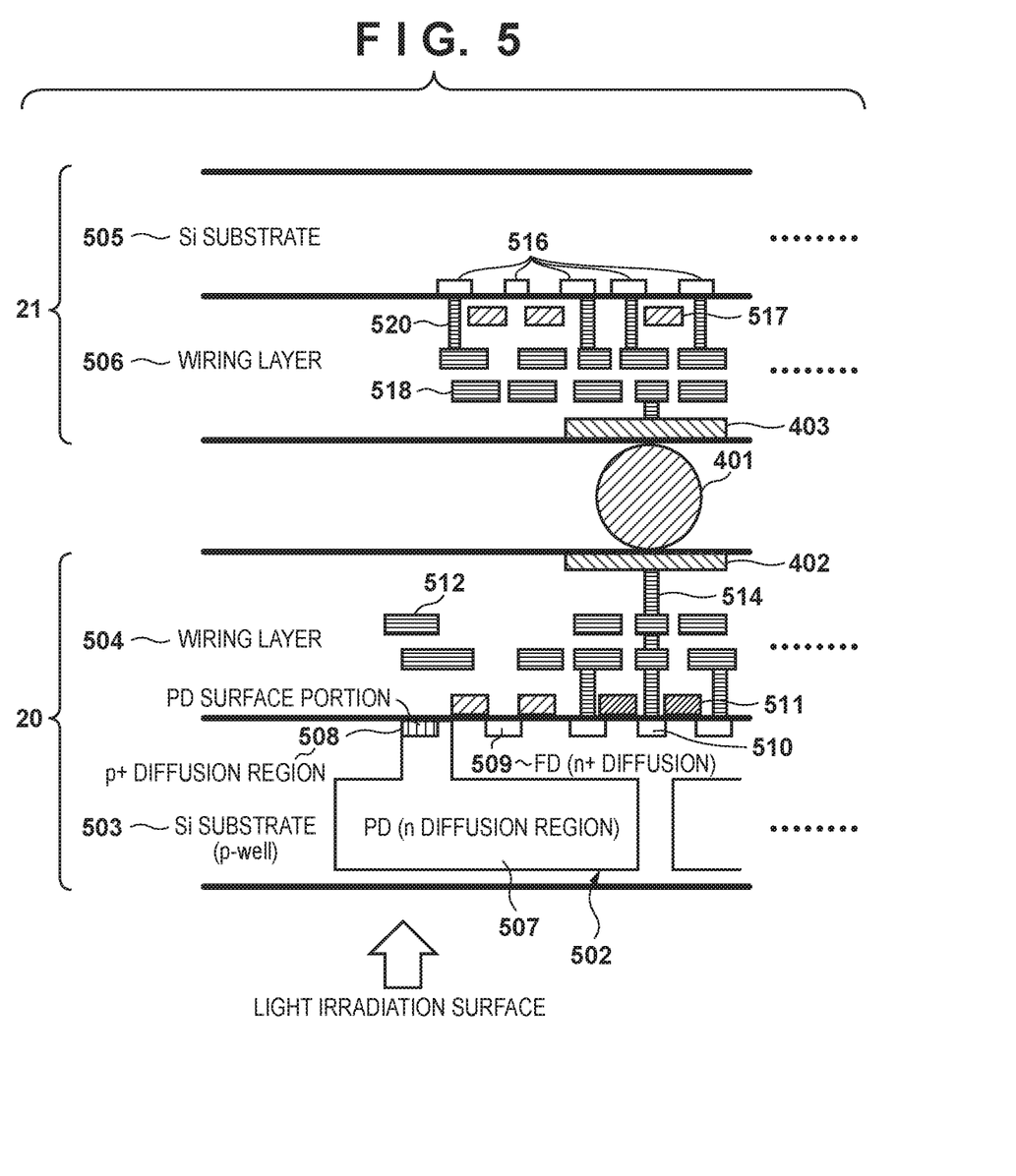
FIG. 5 is a vertical cross-sectional view of the image sensor according to the embodiment of the present invention.

FIG. 5 is a view that schematically illustrates detail of a sectional structure of the image sensor 106, and the same reference numerals are added for configurations in common with FIG. 4A through FIG. 4B. Note that an above/below relationship is reversed between FIG. 5 and FIG. 4A through FIG. 4B.

The first semiconductor chip 20 has a configuration in which a wiring layer 504 is formed on an Si substrate 503.

An n-type diffusion region 507 is formed as the PD 301 on a light irradiation surface side of the Si substrate 503. In addition, a p+ diffusion region 508 for the PD 301, an n+ diffusion region 509 for the FD portion 306, and a plurality of n+ diffusion regions 510 for the transistors 302 to 305 are formed in a surface portion (a boundary portion with the wiring layer 504) of the Si substrate 503.

In the wiring layer 504, signal propagation wiring 512 and gate wiring 511 for the transistors 302 to 305 are formed in an isolation layer comprising SiO2 or the like, and a micro pad 402 comprising Cu or the like is formed in a surface portion (a surface facing the second semiconductor chip 21).

The transfer transistor 302, the reset transistor 303, the amplification transistor 304, and the selection transistor 305 are configured from the n+ diffusion region 509, the n+ diffusion regions 510, and the gate wiring 511 for the transistors.

Furthermore, a via 514 for connecting the n+ diffusion regions 510 and the micro pad 402 is formed in the wiring layer 504.

The second semiconductor chip 21 has a configuration in which a wiring layer 506 is formed on an Si substrate 505.

A plurality of diffusion regions 516 for transistors are formed in a surface portion (a boundary portion with the wiring layer 506) of the Si substrate 505.

In the wiring layer 506, signal propagation wiring 518 and gate wiring 517 for transistors are formed in an isolation layer comprising SiO2 or the like. A micro pad 403 comprising Cu or the like is formed in a surface portion (a surface opposite the first semiconductor chip 20) of the wiring layer 506.

Various circuits are configured from the transistor diffusion regions 516, the transistor gate wiring 517, the signal propagation wiring 518, and the like. Furthermore, a via 520 for connecting the diffusion regions 516 and the micro pad 403 is formed in the wiring layer 506.

The micro pads 402 and 403 are electrically and mechanically connected by a micro bump 401.

Note that, in the present embodiment, description is given of a configuration example in which micro bumps are used as connection terminals for the first semiconductor chip 20 and the second semiconductor chip 21, but configuration may be taken to directly connect the first semiconductor chip 20 and the second semiconductor chip 21 without using micro bumps.

Figure 6:
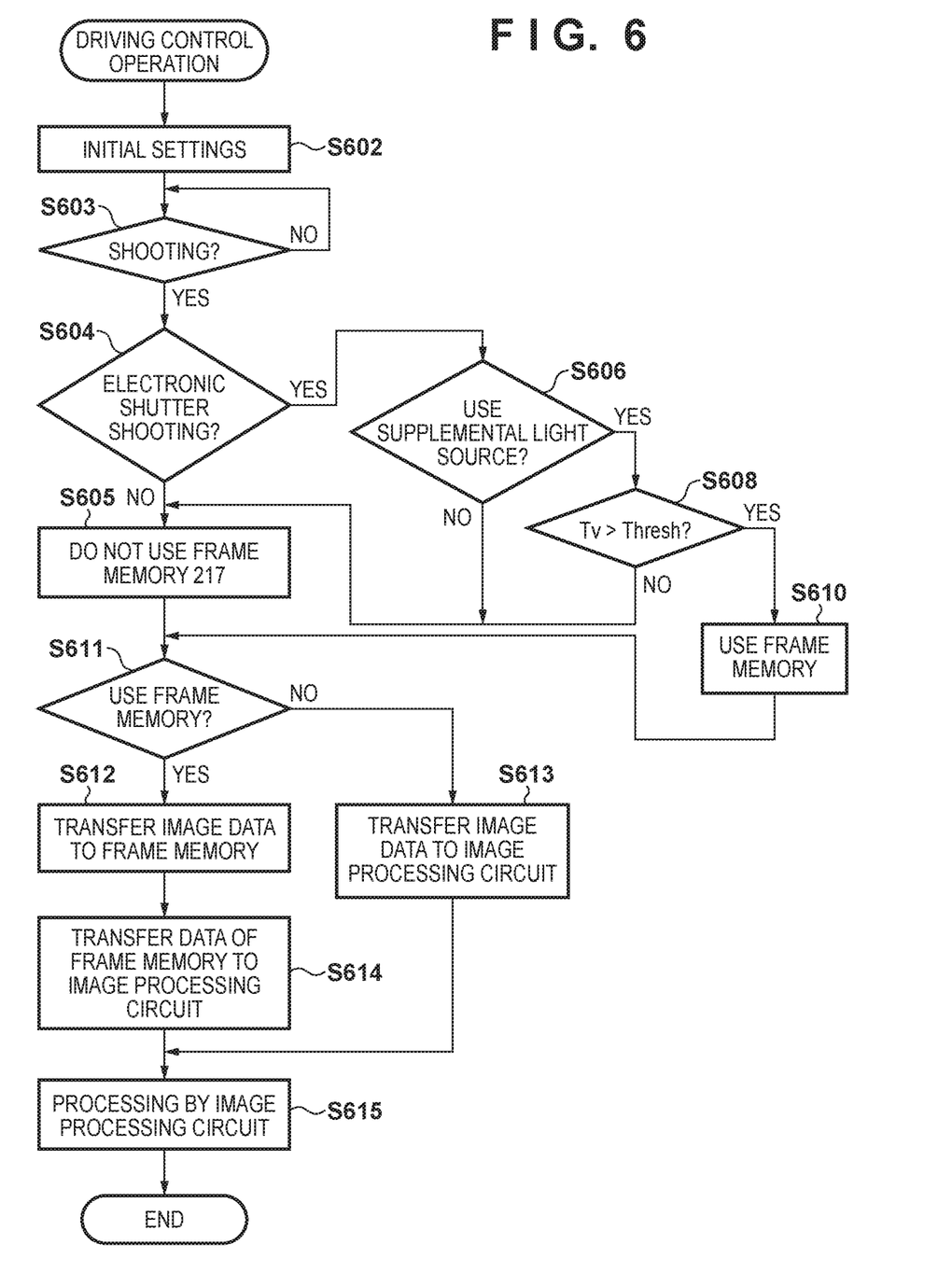
FIG. 6 is a flowchart relating to operation of a first embodiment of the present invention.

A flowchart illustrated in FIG. 6 is used to give description regarding a method of driving the image sensor 106 which has such a configuration. In the present embodiment, with respect to shooting that uses a supplemental light source and where the shutter speed is shorter (faster) than a predefined threshold value, readout time is shortened and the occurrence of the flash-band phenomenon is suppressed by transferring image data to a frame memory.

A digital camera of the present embodiment has a shooting mode that uses the mechanical shutter 103 for shooting (a mechanical shutter mode), and a shooting mode that does not use the mechanical shutter 103 (an electronic shutter mode). The control unit 109 can decide the type of shutter to use in shooting in accordance with the shooting mode, such as by setting the electronic shutter mode if a set shooting mode is a silent mode for example. In addition, apart from the shooting mode, configuration may be such that a user can set the type of shutter to use.

It is assumed that the processing of FIG. 6 is performed whenever a user turns on a power button included in the operation unit 115. In step S602, the control unit 109 executes various initialization processing. When the initialization processing ends, the control unit 109 executes an operation for a still-image shooting standby state. In the still-image shooting standby state, the control unit 109 causes the display unit 111 to function as an EVF, and monitors operations with respect to the operation unit 115. Specifically, the control unit 109 controls each unit to execute moving-image shooting continuously, generate live-view images, and successively display them on the display unit 111.

In step S603, the control unit 109 determines whether a shooting start instruction (for example, a full press operation of a shutter button) through the operation unit 115 has been detected, and advances the processing to step S604 upon determining that a shooting start instruction has been detected, and repeatedly executes step S603 if this is not determined. Note that, if another instruction is detected while waiting to detect a shooting start instruction in step S603, the control unit 109 executes processing in response to the detected instruction.

For example, if a shooting preparation instruction (for example, an operation to press the shutter button halfway) is detected, the control unit 109 can execute an AE process or an AF process. Based on a user setting or an evaluation value generated by the signal processing circuit 107, for example, the control unit 109 can decide exposure settings (including whether or not to light the supplemental light source 116, and an amount of light to emit), or adjust an in-focus position of the lens unit 101 through the lens driving unit 102.

If it is determined in step S603 that a shooting start instruction has been detected, the control unit 109 starts shooting processing for a still image to be recorded. In step S604, the control unit 109 determines whether to perform shooting in the electronic shutter mode, and advances the processing to step S606 upon determining to shoot in the electronic shutter mode, and advances the processing to step S605 when it is not determined to shoot in the electronic shutter mode.

In step S605, the control unit 109, as needed, switches the second switch 217 so that the output destination of the second switch 217 is the P/S conversion unit 219, and advances the processing to step S611. By this, image data that is read from the pixels 201 for this shooting and obtained through the column ADC block 211 is directly supplied to the P/S conversion unit 219 without being temporarily stored in the frame memory 218. In this way, the control unit 109 controls a readout operation of the image sensor 106 so that the frame memory 218 is not used for shooting that uses the mechanical shutter 103. This is because, in a case of using the mechanical shutter 103, a flash-band phenomenon does not occur due to the mechanical shutter 103 being open/closed for an accumulation period common to all pixel lines.

In step S606, the control unit 109 determines whether to use the supplemental light source 116 when shooting (whether to cause light to be emitted), and advances the processing to step S608 upon determining to use the supplemental light source 116, and advances the processing to step S605 upon determining not to use the supplemental light source 116. In other words, the control unit 109 controls a readout operation of the image sensor 106 so that the frame memory 218 is not used for shooting that does not uses the supplemental light source 116. This because a flash-band phenomenon does not occur if the supplemental light source 116 is not used.

In step S608, the control unit 109 determines whether a shutter speed (Tv) for a time of shooting is higher (faster) than a threshold value (Thresh), and advances the processing to step S610 upon determining that it is higher, and advances the processing to step S605 when this is not determined. Here, because an electronic shutter is used, the shutter speed corresponds to the length of the accumulation period. In other words, even in shooting where the supplemental light source 116 is used, the control unit 109 controls a readout operation of the image sensor 106 so that the frame memory 218 is not used when the shutter speed is slow (less than or equal to the threshold value). This because a flash-band phenomenon does not occur if the shutter speed is slow. Note that a specific value of the threshold value (Thresh) can be defined in advance because it is based on, for example, a method of reading out image data, in addition to characteristics unique to an apparatus, such as a number of pixels or an operation clock of the image sensor 106, or the processing capacity of a signal processing circuit or a data transfer circuit. Configuration may be taken to prepare a plurality of threshold values, and have separate uses for the threshold values in accordance with conditions, such as using different threshold values in accordance with a method of reading, for example.

In step S610, the control unit 109, as needed, switches the second switch 217 so that the output destination of the second switch 217 is the frame memory 218, and advances the processing to step S611. In other words, in a case where conditions under which a flash-band phenomenon would occur are satisfied with a readout speed that can be realized without using the frame memory 218, the control unit 109 controls the readout operation of the image sensor 106 so as to use the frame memory 218.

In step S611, upon deciding to use the frame memory 218, the control unit 109 advances the processing to step S612, and upon deciding not to use the frame memory 218, the control unit 109 advances the processing to step S613.

Note that the control unit 109 can execute the processing from step S604 to step S611 in parallel with charge accumulation processing for the image sensor 106.

In step S612, the control unit 109 controls operation of the image sensor 106 so as to read an image signal from the pixels 201 in an order of a pixel line for which the charge accumulation period has ended, and convert the image signal to image data by the column ADC block 211. In addition, the control unit 109 controls operation of the image sensor 106 so as to store the image data in the frame memory 218 through the first and second switches 216 and 217. In step S614, the control unit 109 controls operation of the image sensor 106 so as to transfer the image data stored in the frame memory 218 to the signal processing circuit 107 via the P/S conversion unit 219, and then advances the processing to step S615.

The control unit 109 can control operation of the image sensor 106 so that the operation for storing the image data in step S612 executes in parallel with the operation to transfer the image data in step S614. The control unit 109 controls operation of the timing control circuit 214 so that transfer of the image data from the frame memory 218 to the signal processing circuit 107 in step S614 is executed at a speed (a first data rate) in accordance with processing capacity of the signal processing circuit 107 or the transfer circuit. In contrast, the control unit 109 controls operation of the timing control circuit 214 so that the series of processing in step S612 for reading out the image signal, the A/D conversion, and the storage of the image data in the frame memory 218 is executed at a second data rate faster than the first data rate.

Note that the second data rate can be defined in advance as a value for which the flash-band phenomenon does not occur. The second data rate may be a fixed value, and may be a value that changes in accordance with at least one of the shutter speed and a light-emitting time of the supplemental light source 116. Note that the flash-band phenomenon does not occur if a light emission period of a supplemental light source fits in the charge accumulation period common to all pixel lines. In other words, the smaller a shift of accumulation periods between pixel lines, the more difficult it is for the flash-band phenomenon to occur. Because it is possible to reduce the shift in accumulation periods between pixel lines as the second data rate increases, it is possible to avoid the occurrence of a flash-band phenomenon even with a high (fast) shutter speed.

Meanwhile, in step S613, the control unit 109 controls operation of the image sensor 106 so as to read an image signal from the pixels 201 in an order of a pixel line for which the charge accumulation period has ended, and convert the image signal to image data by the column ADC block 211. The control unit 109 controls operation of the image sensor 106 so that the image data is transferred to the signal processing circuit 107 through the first and second switches 216 and 217 and the P/S conversion unit 219, and then advances the processing to step S615. In such a case, the control unit 109 controls operation of the timing control circuit 214 so as to execute processing for reading out the image signal at the first data rate which does not exceed the processing capacity of the signal processing circuit or the transfer circuit. In a case of transferring image data to the signal processing circuit 107 without going through the frame memory 218, it is possible to shorten a time lag from read out of an image signal until the start of processing by the signal processing circuit 107, in comparison to a case where the transfer goes through the frame memory 218.

In step S615, the signal processing circuit 107 executes predetermined image processing (for example, development processing, encoding processing, or the like) on the image data. Subsequently, the image data is recorded in the recording medium 112 by being stored in a predetermined data file, or transmitted to an external device through the external I/F unit 113.

Note that, in the present embodiment, description was given regarding a configuration where it is determined whether the shutter speed is faster than a threshold value if a supplemental light source is not used for shooting. However, configuration may be taken to use the frame memory 218 irrespective of the shutter speed in a case of shooting that uses a supplemental light source.

As described above, by virtue of the present embodiment, configuration is taken to transfer an image signal read out from pixels to circuitry external to the image sensor after temporarily storing the image signal in a frame memory provided in the image sensor, when performing shooting that uses a supplemental light source. Consequently, it is possible to read out the image signal at high-speed without exceeding the processing capacity of circuitry external or the transfer circuit, and it is possible to effectively suppress occurrence of a flash-band phenomenon.

Second Embodiment

Next, description is given regarding a second embodiment of the present invention. Because the present embodiment can also be worked by a digital camera that has a similar configuration to that of the first embodiment, description is omitted for matters described in the first embodiment. Regarding an adjustment of brightness operation for deciding an amount of light to be emitted by a supplemental light source, there are cases where shooting that uses a supplemental light source is performed without using a mechanical shutter, but the present invention can also be applied to shooting at a time of an adjustment of brightness operation.

Still-image shooting for adjustment of brightness is executed before still-image shooting for recording, when a shooting start instruction (for example, a full press of the shutter button) is detected. Shooting conditions (an amount of light to be emitted by the supplemental light source 116, a shutter speed, or the like) at the time of still-image shooting for adjustment of brightness can be decided by the control unit 109 in accordance with subject luminance information or the like obtained by using the signal processing circuit 107 on data of a moving image being shot in a still-image shooting standby state. Below, light emission by the supplemental light source 116 at a time of still-image shooting for adjustment of brightness is referred to as preemission, and light emission of the supplemental light source 116 at a time of still-image shooting that is executed in accordance with a shooting start instruction is referred to as main emission.

Figure 7:
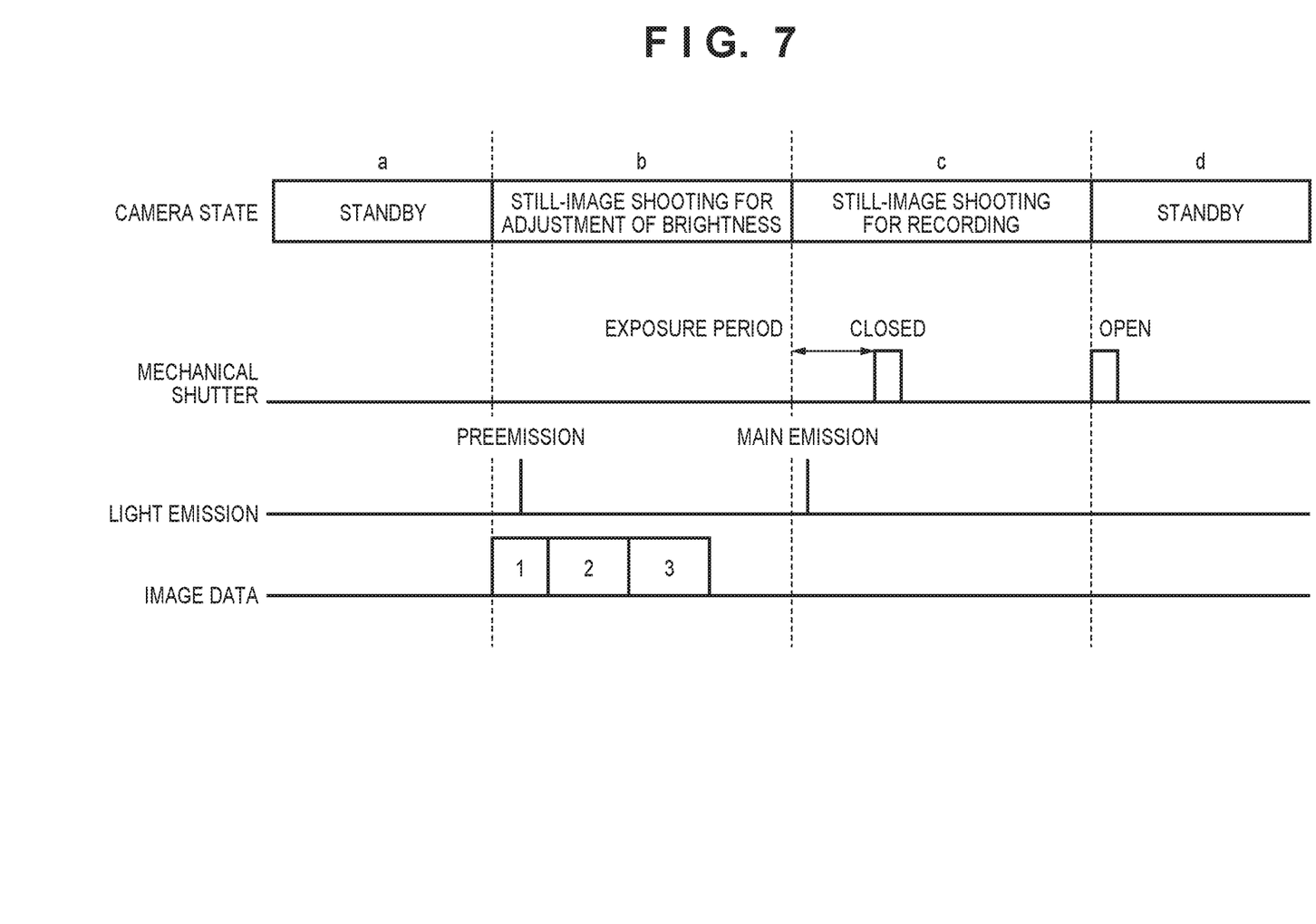
FIG. 7 is a timing chart relating to a second embodiment of the present invention.

FIG. 7 is a timing chart relating to a series of operations in the present embodiment where the digital camera detects a shooting start instruction in the still-image shooting standby state, executes still-image shooting for recording after performing still-image shooting for adjustment of brightness, and then returns to the standby state. Note that main shooting is assumed to be in the mechanical shutter mode.

In a still-image shooting standby state a, as described above, moving-image shooting is performed, and a live-view image is displayed on the display unit 111. In the still-image shooting standby state, when a shooting preparation instruction is detected, the control unit 109 executes an AF process for the lens unit 101, or an AE process for deciding exposure settings. In the AE process, based on subject luminance information or a user setting, the control unit 109 decides whether to emit light by the supplemental light source 116 and a preemission amount. Subsequently, when a shooting start instruction is detected, the operation state of the digital camera transitions to a still-image shooting state for adjustment of brightness b in order to decide a main emission amount of the supplemental light source 116.

Upon transitioning to the still-image shooting state for adjustment of brightness b, the control unit 109 first causes the supplemental light source 116 to perform preemission, and executes still-image shooting. In still-image shooting for adjustment of brightness, the mechanical shutter 103 is not used. Accordingly, the control unit 109 executes processing from step S608 of FIG. 6 which is described in the first embodiment. When electronic shutter speed is higher (faster) than a threshold value, the control unit 109 controls operation of the image sensor 106 so as to read out an image signal by the second data rate, and store it in the frame memory 218 in a charge accumulation period 1 (step S612). The control unit 109 then controls operation of the image sensor 106 so as to transfer the image data stored in the frame memory 218 to the signal processing circuit 107 at the first data rate (step S614, period 2). In contrast, if electronic shutter speed is less than or equal to the threshold value, the control unit 109 in period 2 controls operation of the image sensor 106 so as to read out the image signal at the first data rate, and transfer it to a unit external to the image sensor 106 without storing it in the frame memory 218 (step S613).

When transfer of the image data ends, the signal processing circuit 107 generates information (for example, luminance information) for deciding the main emission amount from the image data (step S615). The control unit 109 decides the main emission amount based on this information (period 3). Note that the periods 1 and 2 may overlap, and the periods 2 and 3 may overlap.

When the main emission amount is decided, the operation state of the digital camera transitions to a still-image shooting state for recording (a main shooting state) c, and the control unit 109 starts exposure (charge accumulation). The control unit 109 causes the supplemental light source 116 to light (main emission) during the charge accumulation period in accordance with the main emission amount decided earlier.

When the charge accumulation period ends, the control unit 109 closes the mechanical shutter 103, ends exposure, and starts readout and transfer of the image signal. When transfer of the image data ends, the operation state of the digital camera transitions to the standby state d, and the control unit 109 starts operation in the still-image shooting standby state again.

By virtue of the present embodiment, it is possible to realize a similar effect to that of the first embodiment, even at a time of shooting for adjustment of brightness of the supplemental light source 116.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-234300, filed on Dec. 6, 2017, which is hereby incorporated by reference herein in its entirety.

What is claimed is:

1. An electronic device comprising:
   an image sensor having a plurality of pixels and capable of switching between a first path in which an image signal outputted from the plurality of pixels is stored in a frame memory and then outputted from the frame memory to an external of the image sensor, and a second path in which the image signal outputted from the plurality of pixels is outputted to the external of the image sensor without being stored in the frame memory;
   a processor that executes a program stored in a memory and functions as:
      a control unit configured to, in a case of performing shooting that uses a supplemental light source, control the image sensor so as to use the first path and to make a speed at which the image signal is outputted from the plurality of pixels and stored in the frame memory faster than a speed at which the image signal is outputted from the frame memory to the external of the image sensor,
   wherein, in a case of using the first path, the speed at which the image signal is outputted from the plurality of pixels is defined so that a light emission period of the supplemental light source fits within a charge accumulation period common to all of the plurality of pixels.

2. The electronic device according to claim 1, wherein, in a case of performing shooting that uses a supplemental light source and with a shutter speed that is faster than or equal to a predefined threshold value, the control unit controls the image sensor so as to use the first path and to make the speed at which the image signal is outputted from the plurality of pixels faster and stored in the frame memory than the speed at which the image signal is outputted from the memory to the external of the image sensor.

3. The electronic device according to claim 1, wherein, in a case of performing shooting where a shutter speed is slower than a predefined threshold value, the control unit controls the image sensor so as to use the second path even in a case where the shooting uses a supplemental light source.

4. The electronic device according to claim 1, wherein, in a case of performing shooting that uses a mechanical shutter, the control unit controls the image sensor so as to use the second path even in a case where the shooting uses a supplemental light source.

5. The electronic device according to claim 1, wherein shooting that uses the supplemental light source is shooting for adjustment of brightness of the supplemental light source.

6. The electronic device according to claim 1, wherein the image sensor comprises an A/D conversion circuitry that applies an A/D conversion to the image signal.

7. The electronic device according to claim 1, wherein
   the plurality of pixels are provided in a first semiconductor chip,
   the frame memory is provided in a second semiconductor chip, and
   the first semiconductor chip and second semiconductor chip are vertically stacked and are electrically and mechanically connected.

8. A method of controlling an electronic device having an image sensor having a plurality of pixels and capable of switching between a first path in which an image signal outputted from the plurality of pixels is stored in a frame memory and then outputted from the frame memory to an external of the image sensor, and a second path in which the image signal outputted from the plurality of pixels is outputted to the external of the image sensor without being stored in the frame memory, the method comprising:
   in a case of performing shooting that uses a supplemental light source, controlling the image sensor so as to use the first path and to make a speed at which the image signal is outputted from the plurality of pixels and stored in the frame memory faster than a speed at which the image signal is outputted from the frame memory to the external of the image sensor,
   wherein, in a case of using the first path, the speed at which the image signal is outputted from the plurality of pixels is defined so that a light emission period of the supplemental light source fits within a charge accumulation period common to all of the plurality of pixels.

9. A non-transitory computer-readable medium storing a program for a computer included in an electronic device,
   wherein the electronic device comprises an image sensor having a plurality of pixels and capable of switching between a first path in which an image signal outputted from the plurality of pixels is stored in a frame memory and then outputted from the frame memory to an external of the image sensor, and a second path in which the image signal outputted from the plurality of pixels is outputted to the external of the image sensor without being stored in the frame memory, and
   wherein the program, when executed by the computer, causes the computer to function as a control unit configured to, in a case of performing shooting that uses a supplemental light source, control the image sensor so as to use the first path and to make a speed at which the image signal is outputted from the plurality of pixels and stored in the frame memory faster than a speed at which the image signal is outputted from the frame memory to the external of the image sensor,
   wherein, in a case of using the first path, the speed at which the image signal is outputted from the plurality of pixels is defined so that a light emission period of the supplemental light source fits within a charge accumulation period common to all of the plurality of pixels.

* * * * *